UNITED STATES PATENT OFFICE.

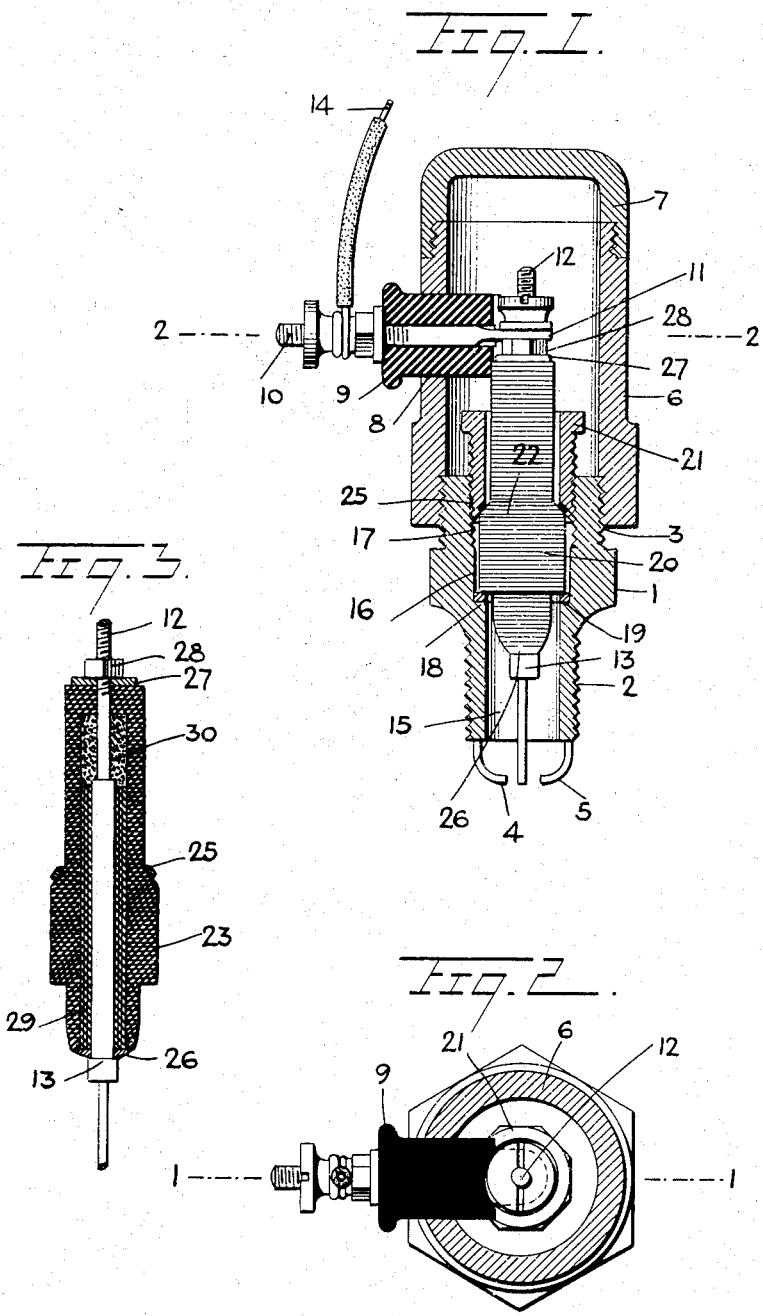

JOHN DE LEOAN BARMORE, OF APALACHICOLA, FLORIDA.

SPARK-PLUG.

1,092,687. Specification of Letters Patent. Patented Apr. 7, 1914.

Application filed June 18, 1912. Serial No. 704,295.

*To all whom it may concern:*

Be it known that I, JOHN DE LEOAN BARMORE, a citizen of the United States, and a resident of Apalachicola, in the county of Franklin and State of Florida, have invented a new and Improved Spark-Plug, of which the following is a full, clear, and exact description.

This invention relates to improvements in spark plugs and has for an object to provide an improved structure which will be waterproof and which will have its weaker parts protected by a strong outer casing or shell.

Another object of the invention is to provide a spark plug with an improved insulating member for carrying one of the contact members, together with associated means for holding the same properly between a pair of points.

In carrying out the objects of the invention, a contact member is provided which is surrounded except at the ends with an insulating material and is clamped or connected with a supporting screw member which is designed to be screwed into the cylinder of an engine, and to which is secured by suitable threads a protecting housing. A water-tight insulating member is provided for carrying the wire into the contact member so that a plug may be used at any desired place even though the same is submerged in water.

A practical embodiment of the invention is represented in the accompanying drawings forming a part of this specification, in which similar characters of reference indicate corresponding parts in all the views.

Figure 1 is a longitudinal vertical section through an embodiment of the invention; Fig. 2 is a section through Fig. 1 on the line 2—2; and Fig. 3 is an enlarged longitudinal vertical section through the insulation and associated parts surrounding the central contact member.

Referring to the accompanying drawings by numerals, 1 indicates a sleeve threaded at 2 and 3. The threaded portion 3 is adapted to be screwed into a cylinder and when properly in position in the cylinder supports the contact points 4 and 5 properly within the cylinder, the contact points 4 and 5 being connected with the portion 3 in any desired manner. The threaded portion 3 has connected therewith a sleeve 6, which in turn has a removable cap 7 threaded thereon at the outer end. The sleeve 6 is provided with an aperture 8 in which an insulating member 9 is placed which carries a bolt 10 having one end formed with an eyelet 11 fitting over the threaded end 12 of the central contact rod 13. The insulation 9 is made to snugly fit the aperture 8 so that water cannot enter into the housing 6. It will be evident that current may be supplied to the bolt 10 by any desired means through a suitable wire 14. If it is desired to use the plug submerged, the outer end of the bolt 10, the clamping nuts associated therewith, and all exposed parts of the wire 14 must be covered by a suitable water-proof insulation. Where water splashes over the spark plug occasionally, this is not absolutely necessary.

The sleeve 1 is formed with a bore 15 merging into a slightly enlarged bore 16 threaded at 17. At the point where the bores 15 and 16 merge, a shoulder 18 is provided designed to receive a washer 19 preferably of pliable metal, as for instance copper. The insulation 20 of the contact member 13 is designed to rest against the washer 19 and to be pressed tightly against the same by a suitable clamping nut 21 formed on the order of a sleeve. The nut 21 engages the threaded portion 17 and presses against the beveled end 22 of the enlargement 23 of member 20, the nut 21 being formed with a beveled portion 24 for causing a better clamping action. If desired, a suitable packing 25 could be inserted between the beveled portions 22 and 24 so as to give a more resilient action to the clamping nut 21. Above the enlargement 23 the insulating member 20 is reduced in diameter, and also below the enlargement 23 the insulation 20 is reduced in diameter and rests against a stop 26 of metal rigidly secured to the metallic contact member 13. A washer 27 is provided at the top of the insulation 20 and is pressed toward stop 26 by a suitable nut 28. This is very desirable as the outer portion of the insulation 20 is formed from a plurality of disks of insulating material, preferably mica. Arranged interiorly of the disks of mica are a plurality of convolutions 29 of insulating material, preferably sheets of mica, while above the sheets 29 is arranged an asbestos filling 30 which surrounds the reduced threaded portion 12 of the contact member 13. This permits the nut 28 to press the washer 27 downwardly or in a direction toward the stop 26. The asbestos filling 30 is especially desirable where for any reason some of the disks of mica are injured and it is necessary to remove the same. When this occurs if the number of disks were not an appreciable amount of the entire insulation, the asbestos filling 30 may be compressed so as to allow the remaining disks of mica to be pressed together. If desired some of the filling 30 could be removed when some of the disks are removed.

In operation, after the plug has been assembled as shown in Fig. 1, the threaded portion 2 is screwed into a cylinder and the wire 14 connected to the bolt 10. The wire 14 is connected to one side of a source of electrical energy and the engine is grounded or connected to the other side of said source, a suitable switch being interposed in wire 14 for opening and closing the circuit at a proper time.

Having thus described my invention I claim as new and desire to secure by Letters Patent:—

1. A spark plug comprising a supporting housing including a removable sleeve, a contact connected with said removable sleeve, a second contact arranged with one end in proximity with said first mentioned contact, a stop rigidly secured to said second mentioned contact near said last mentioned end, insulating means for said second mentioned contact, said insulating means comprising a winding or convolution of mica extending for less than the full length of said contact, a plurality of mica disks surrounding said convolution of mica and said contact and extending to a point above said winding or convolution of mica and forming a chamber above said winding or convolution of mica, and an asbestos filling arranged in said chamber for compensating for the length of said disk column in case of compression and a removal of some of the disks, means for clamping said mica and said asbestos so as to press the mica disks against said stop, and means for connecting a source of energy to said second mentioned contact.

2. A spark plug comprising a pair of contact members of opposite polarity, insulating means for one of said contacts, said insulating means comprising a convolution of mica extending for less than the full length of said last mentioned contact, a plurality of disks of mica surrounding said convolution of mica and extending to a point beyond said convolution of mica whereby a chamber is provided around said last mentioned contact at the end of said convolution of mica, a compressible refractory material positioned in said chamber for compensating for the length of the disk column in case some of the disks are removed, means for clamping said insulating means firmly to said last mentioned contact, and means for connecting a source of energy to said last mentioned contact.

In testimony whereof I have signed my name to this specification in the presence of two subscribing witnesses.

JOHN DE LEOAN BARMORE.

Witnesses:
H. C. OLIVER,
H. G. FANNING.